United States Patent [19]

Schwartz

[11] 3,987,243
[45] Oct. 19, 1976

[54] IMAGE ENHANCEMENT METHOD AND APPARATUS

[75] Inventor: Jacob Schwartz, Arlington, Mass.

[73] Assignee: Sanders Associates, Inc., South Nashua, N.H.

[22] Filed: Nov. 3, 1975

[21] Appl. No.: 628,179

[52] U.S. Cl. .......................... 178/6.8; 178/DIG. 34; 355/52
[51] Int. Cl.² .......................................... H04N 7/18
[58] Field of Search .................. 178/6, 6.8, DIG. 20, 178/DIG. 21, DIG. 25, DIG. 34; 355/52

[56] References Cited
UNITED STATES PATENTS

| | | | |
|---|---|---|---|
| 3,366,735 | 1/1968 | Hecker | 178/6.8 |
| 3,786,186 | 1/1974 | Thomas | 178/6.8 |
| 3,883,436 | 5/1975 | Fletcher | 178/DIG. 25 |

Primary Examiner—Howard W. Britton
Attorney, Agent, or Firm—Louis Etlinger; Robert K. Tendler

[57] ABSTRACT

Combined optical and electronic apparatus provide for various types of image enhancement by producing two images of the same scene which differ by a predetermined property, and by electronically subtracting the images to yield a video difference signal which emphasizes or deemphasizes a predetermined characteristic of the scene at which the apparatus is pointed. Various types of image enhancement are obtained by simultaneous scanning of the images produced by two imaging systems in which a relative difference in properties between the images such as deliberate misalignment, optical density difference, image resolution, image magnification or image receptor displacement is introduced to create a particular type of enhancement. The intensities from pairs of scanned spots are subtracted on a point-by-point basis to yield a video difference signal which when displayed provides an image enhanced in a particular manner. Property differences are in general introduced in the aperture plane, at the optics or in the image plane. The subject system can be arranged for edge enhancement, size discrimination, emphasis of lines in a predetermined direction, peripheral image enhancement, and central image or boresite enhancement. This system is particularly useful in clutter rejection for TV-based target tracking systems.

20 Claims, 35 Drawing Figures

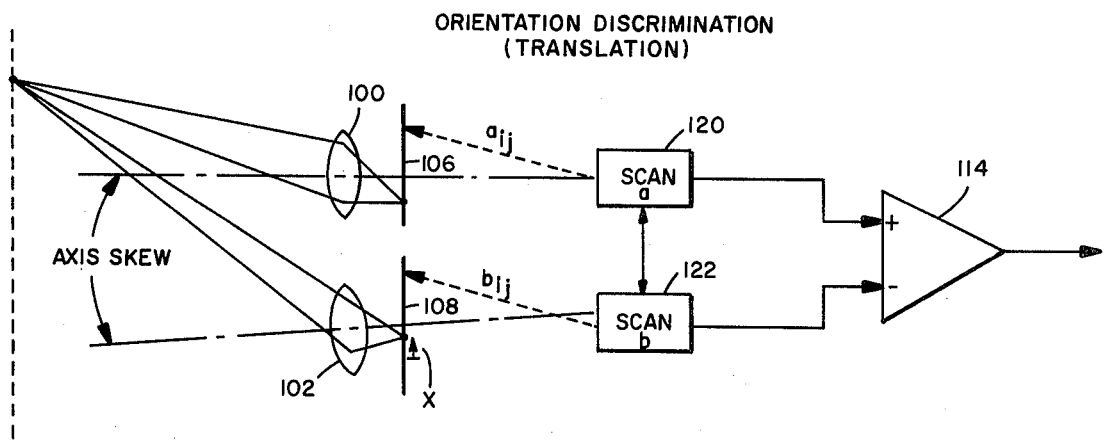
FIG. 9
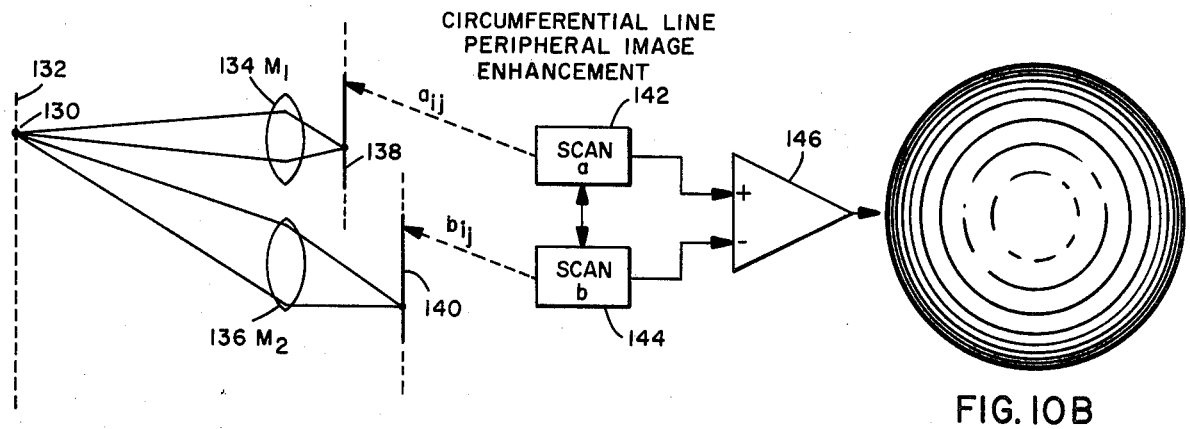
FIG. 10A
FIG. 10B
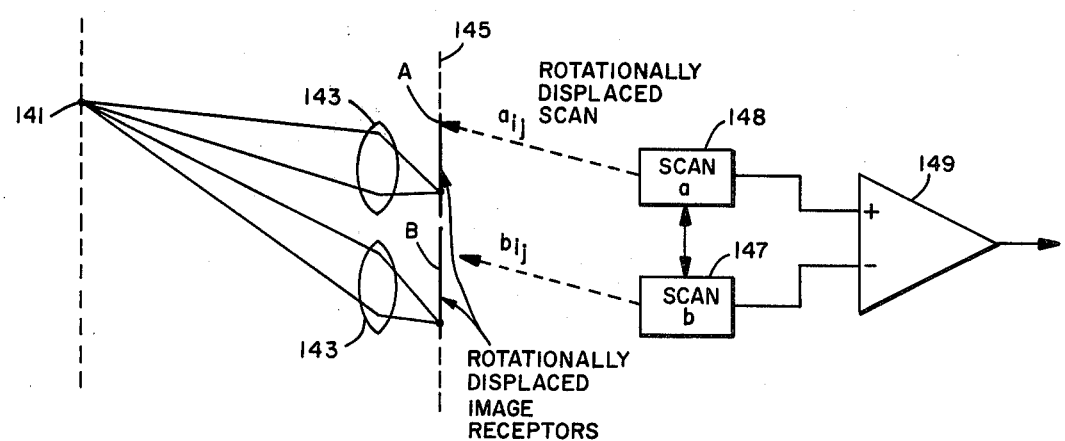
FIG. 11A

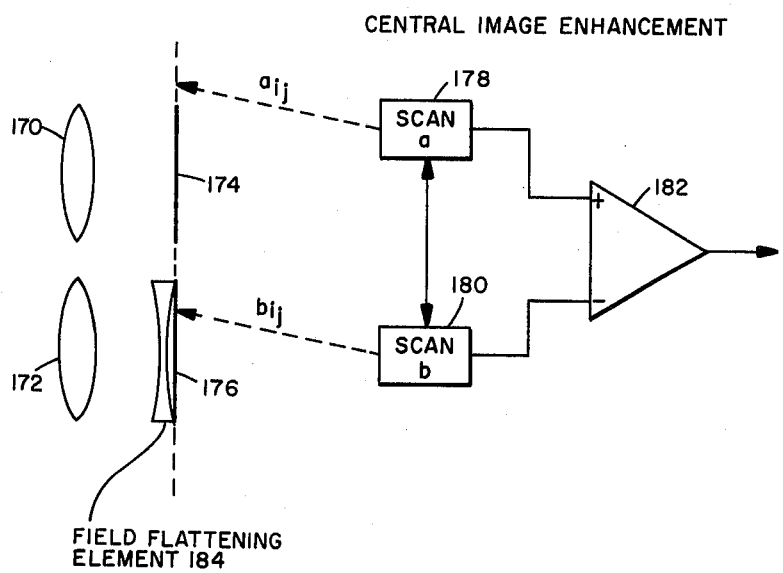
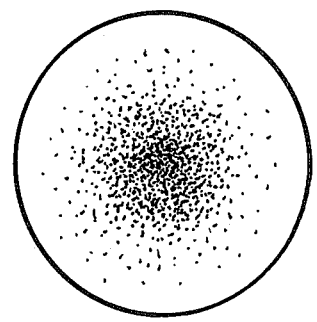
FIG. 13A
FIG. 13B
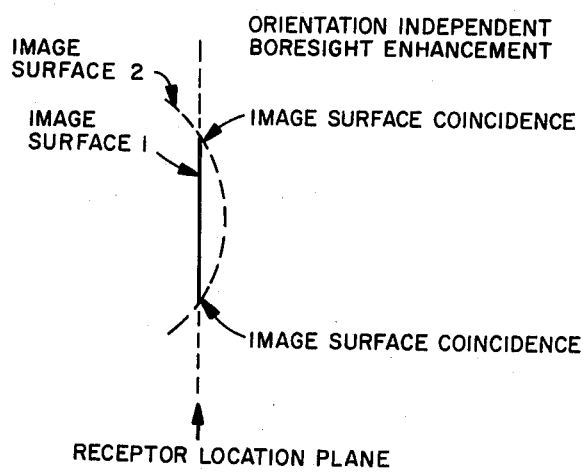
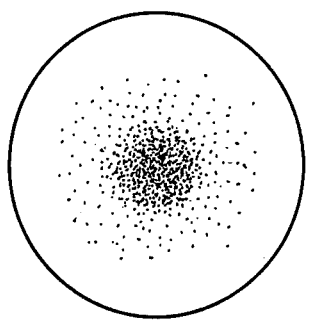
FIG. 14A
FIG. 14B
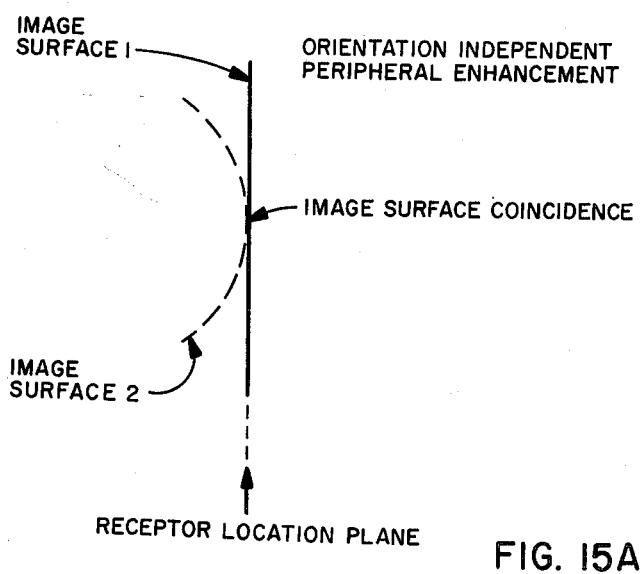
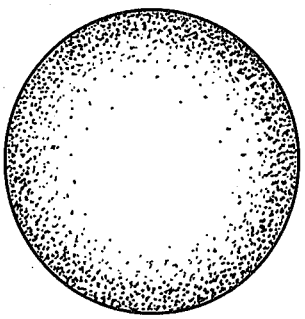
FIG. 15A
FIG. 15B

CENTRAL IMAGE ENHANCEMENT

BORESITE IMAGE ENHANCEMENT

DENSITY FILTER

PERIPHERAL IMAGE ENHANCEMENT

DENSITY FILTER

IMAGE ENHANCEMENT METHOD AND APPARATUS

FIELD OF THE INVENTION

This invention relates to combined optical and electronic apparatus for various types of image enhancement and more particularly to a system which produces two images of the same scene which differ by a predetermined property, and electronically subtracts the images to yield a video difference signal which emphasizes or deemphasizes a predetermined characteristic of the scene at which the apparatus is pointed.

BACKGROUND OF THE INVENTION

It has long been known that by suitable photographic processing involving the use of positive and negative forms of an image that certain characteristics of the image can be emphasized or deemphasized by the overlay of various positive and negative images with suitable translational or rotational displacements, density differences and/or spacings. It will be appreciated, however, that processing and display when utilizing strict photographic techniques is time consuming in view of the length of time necessary to develop, prepare and position the positive and negative images. This technique is thus not a real time technique and thus is not applicable to on board target tracking systems in missiles, guided projectiles and various other guided ordinances. Image enhancement has also been accomplished in the past by use of Fourier Transformation of a segmented image with appropriate transform manipulations enhancing or deemphasizing a particular characteristic. This is usually accomplished with a large amount of computer storage and the necessity of storing the value of each point in a given image so that the appropriate Fourier Transform manipulations can be performed. Thus in image enhancement by computer processing, substantially all values in the input image must be utilized in calculating each point in the output image and these values must be stored and appropriately addressed so that the appropriate transform can be applied. With the advent of the Fast Fourier Transform (FFT), computer time has been significantly reduced. However, even with the Fast Fourier Transform algorithm all points in the image must still be sampled and stored, at least once, which still takes considerable time. This technique is likewise not readily adapted to on board target tracking systems. This is because the FFT processing results in a non-real time system for image enhancement in which the final result may take as short a time as 5 minutes for a 500 line TV picture or as long a time as several days depending on the complexity and degree of enhancement required. Note that a 500 × 500 line TV picture involves 250,000 elements. A 10,000 × 10,000 line picture typical of photographic resolution, requires processing of $10^8$ elements.

Holography has also been used with spatial filtering for image enhancement as a hologram involves Fourier Transforms, without need for computation. However, the required photographic development and reprojections prevent these techniques from being applicable to the above mentioned on board apparatus. Also coherent illumination is necessary.

The subject system is a "real time" system which may be utilized on board a guided missile, etc. The system involves two optical channels and a point-by-point subtraction of the two images produced by the two channels. This provides a video difference signal which represents the difference between a positive and negative image of the scene at which the system is pointed. In terms of Fourier Transforms, the transform of the image equals the transform of the object multiplied by the transfer function of the optical system.

In this patent a number of techniques are enumerated that allow synthesis of a wide variety of transfer functions which lead in turn to a variety of spatial filter effects on images. Translational, rotational, density and/or magnification differences between the two images can be optically or electronically introduced to provide, for instance, edge enhancement, size discrimination, enhancement of a particular set of parallel image lines, and peripheral image enhancement or enhancement of the center of the image, sometimes called "boresite" enhancement. It should be noted that while some of the above enhancements may be accomplished by Fourier Transform manipulations, in a computer or holographic manipulations, different effects depending on location of the image plane are not achieveable by such techniques. These enhancements are those which are a function of position in the image plane. Thus, in addition to the real time aspect of this invention, there is the added capability of providing non-Fourier Transform enhancements.

In essence, the subject system provides the equivalent of two optical systems referred to herein as "two barrel optics" in which the receptors of these two optical systems are scanned point-by-point in a twin scan system with the outputs from the scanning apparatus being subtracted on a real time basis, and with the video difference signal then being displayed on a conventional raster scan device. The desired enhancement, or deemphasis, is obtained by controlling the image difference parameter between the images in the optical channels such that the positive and negative images are electronically superimposed in a manner similar to the photographic process.

In one embodiment the subject system is designed for edge enhancement and size discrimination so that an image may be enhanced over background clutter by virtue of its sharp edges as well as its small size as compared to background objects. This may be important in, for instance, picking an aircraft out of clutter involving clouds behind the aircraft. In this case it will be appreciated that the aircraft is much smaller than the clouds. Moreover the aircraft has sharp edges as opposed to the usual cloud configuration in which the edges of the clouds are not as sharply defined. In one embodiment this is accomplished by utilizing a "two barrel" system and by scanning the images produced, with the image produced by one barrel being blurred by receptor offset from the focal plane of this barrel. This is called the "focus-defocus" case. For the present purposes the term "two barrels" refers to two optical systems or channels in which each barrel produces an image. This system involves a "parallel twin scan" in which two parallel moving scanning beams are produced, one scanning one image and the other scanning the other image. The scanning beams simultaneously read out a corresponding element or corresponding location on each of the receptors. As will be discussed later, the same result can be achieved in a one barrel system with appropriately weighted summing or averaging of elements adjacent to the scanned element providing a simulated blurr.

Emphasis of a particular series of parallel lines, with simultaneous deemphasis of orthogonally oriented lines, may be accomplished by a twin scan two barrel system, with one scanning beam being offset with respect to the second scanning beam in a direction orthogonal to the line to be emphasized. This means that while one beam scans a given element in one image the other beam scans an adjacent element in the other image. The deemphasized lines will be the lines in the direction of the scan offset. This same line emphasis/deemphasis can also be accomplished with parallel twin scan and a skewing of the optical axes in the two barrel system with the offset angle in the direction of the deemphasized lines. The skewing displaces the position of one image with respect to the other image to yield the same result as the offsetting of one scanning beam.

The subject system also permits peripheral image enhancement in which circumferential line elements of objects at the periphery of the image plane are enhanced over those at the center. This is accomplished in one embodiment in a two barrel system with a parallel twin scan arrangement, with the two optical systems having slightly different magnifications. In another embodiment radial line peripheral enhancement utilizes a two barrel system with rotationally displaced receptors and a rotationally displaced twin scan system with the rotational offset providing the radial line peripheral enhancement.

Another type of peripheral image enhancement involving line symmetry enhancement at the periphery of the image may be accomplished by a parallel twin scan system with identical optical channels, in which the two barrels have parallel optical axes but the receptors are skewed about the line of intersection of their superimposed receptor planes.

Additionally, orientation independent peripheral image enhancement may be accomplished with the use of a two barrel, parallel twin scan system and field flattening optics at the image plane of one of the barrels, with focal plane coincidence of the two optical systems at the center of the overlapped images.

Central image or boresite enhancement, on the other hand, can be accomplished with parallel twin scan apparatus and a field flattening optics at the image plane of one of the two barrels, with focal plane coincidence of the two optical systems at the outer edge of the overlapped images. The same type of central image or boresite enhancement may also be accomplished by use of a centrally weighted, radially-weakening density filter at the image plane of one of the optical systems.

In general the above systems can be characterized as follows:

$$\text{visual image displayed} = ^{-1}\{f(a_{x,y}) - f(b_{x,y})\},$$

where $f$ is a monotonic function,
where $a_{x,y}$ is the voltage on an image point in the $(a)$ channel at coordinates $(x, y)$,
where $b_{x,y}$ is the voltage on an image point in the $(b)$ channel at coordinates $(x, y)$,
In general:

$$a(x, y) = \int l(x', y') G_a(x-x', y-y') \, dx'dy'$$

where $G(x-x', y-y')$ is the point spread function of a point imaged at coordinates $(x', y')$; as seen at image coordinates $(x, y)$ where image coordinates $(x, y) - M\xi, M\eta)$; where $M$ is magnification; and where $\xi, \eta$ are the orthogonal coordinates of the object in the object plane; and where $l(x', y')$ is the "idealized image intensity corresponding to the object intensity at $(M\xi', M\eta')$, $M\eta'$), The point spread function is the variable in terms of apodization in the lens plane, lens system characteristics or receptor orientation and location in the $(a)$ channel.

$$b_{x,y} = \int l(x', y') G_b(x-x', y-y') \, dx'dy'$$

Possible monotonic functions, $f$, applied as above, may result in images related to the original such as $$\frac{1}{\frac{1}{a} - \frac{1}{b}}, \frac{a}{b}$$

among others, and since all of these are nonlinear, they may yield types of enhancement that cannot be performed by Fourier Transforms.

It will be appreciated that in all the above enhancement techniques the twin scan outputs are differentially added to give the aforementioned video difference signal which is then presented by a conventional raster scan display. Ratios of twin scan output signals and other functions also provide for a variety of image enhancement possibilities not coverable with Fourier Transform methods and are included as part of the subject invention.

What has heretofore been described involves analog processing by virtue of certain optical arrangements to provide for various types of image enhancement/deemphasis via electronic positive and negative image overlay. However, similar results can be obtained with some time lag by the use of digital processing with a single barrel system through the use of digital processing to simulate translational offset, rotational offset and various adjacent element weighted summing or averaging heretofore mentioned.

The enhanced image, as described above, can always be added to unprocessed positive (or negative) image, with mixtures of the original and enhanced images in any proportion. Aside from what aids such mixtures may provide to an observer, such mixtures can be used for equalization of spatial frequencies analogous to audio equalization in hi fi equipment. For example, if the modulation transfer function of an imaging system trails off with increasing spatial frequency (as it always does), and if signal/noise is sufficiently good, much of the roll - off can be compensated by adding an amplified version of focus-defocus enhancement (essentially with a $S^2$ low-end roll-off) to the original image, which tends to equalize the optical qualities up to the high end roll-off of the enhanced image.

A further possibility is to combine the original unenhanced image, in black and white, (on a color display) with the enhancement signal, derived as in the above description, converted to a chroma parameter. There are several ways to do this, as the chroma signal provides two degrees of freedom. One way is to: choose the hue, say red, as fixed. Let the overlay signal control saturation (while unenhanced picture controls gray level). Choose the degree of saturation, and let the overlay control hue. Then pick an 1:1 relationship between hue and saturation or between Q&I signals.

Then define a path in chroma space and let the overlay control position along this path. The "spare" degree of freedom, at least in principle, permits two independent overlays. For example, using displacement between imagers, and three devices, one can obtain: 1. a straight picture, 2. a left-right displacement, 3. up-down displacement. Now, let the straight picture operate the black and white channel; let the left-right displacement operate the I signal, and let the up-down displacement operate the Q signal. Thus we have two independent overlays presented simultaneously on one screen.

In another embodiment, in a two barrel system, using separate lenses it is possible to have different size and shape aperture stops in each one, e.g. a square aperture in one and a circular aperture in the other. This will tend to emphasize certain shapes of objects, in this example objects with fourfold symmetry and the right orientation. The differences could be even more subtle, e.g. different apodizations in the aperture planes of the two lenses. The apodizations may simply have radial variation about the lens axis; more generally they may have circumferential variation, which would tend to emphasize objects of certain shapes of symmetries as well as sizes.

Aperture stops of apodizing filters can be applied sequentially, in alternation with a single lensing system as well as simultaneously in two lensing systems, if picture motion is not too rapid.

It will be appreciated that a computer or electronically controlled apodizing screen may be utilized in the aperture plane (which can itself be a video image or pattern, say on a liquid crystal display, or on a schlieren medium such as the oil film in a G.E. light valve, where an electron beam "writes" a schlieren pattern on a surface, to be in a lens plane for this application. Rapidly changing and controlled apertures can be formed ahead of one or the other optical channels. In other words, with a 2-D imaging screen capability in the lens plane, different for each lens, one can either "write in" specifications corresponding to the desired emphasis characteristics or, "closing the loop", "lock on" to an acquired image.

It is therefore an object of this invention to provide a real time optical processing system for image enhancement involving the generation of a video difference signal from scanning the images developed by two optical channels, either actual or simulated.

It is another object of this invention to provide improved apparatus for a wide variety of image enhancement/deemphasis results in which edge enhancement, size discrimination, plane emphasis/deemphasis, peripheral image enhancement and/or central image or boresite enhancement is provided.

It is another object of this invention to provide novel image enhancement apparatus and methods involving real time processing and point-by-point treatment of images in which only a pair of image values are necessary at any given period of time for the generation of an enhanced image.

These and other objects of this invention will be better understood in connection with the following description in view of the appended drawings in which:

BRIEF DESCRIPTION OF THE DRAWINGS

FIG. 9 is a diagramatic illustration of a system for orientation discrimination by virtue of translation engendered by the skewing of the optical axis of one of the optical systems with respect to the optical axis of the other of the optical systems in a parallel twin scan embodiment;

FIGS. 10A and 10B represent a circumferential line peripheral image enhancement system in which optical systems of different magnification are utilized to produce peripheral enhancement;

FIGS. 11A–11C represent a radial line peripheral enhancement system to produce peripheral enhancement;

FIGS. 13A and 13B illustrate a central or boresite image enhancement system utilizing a field flattening element in one of the optical channels to produce central image enhancement;

FIGS. 14A and 14B are diagramatic illustrations of the image surface coincidence at the periphery of an overlay image, for boresite enhancement;

FIGS. 15A and 15B are diagramatic illustrations of image surface coincidence at the center of an overlay image for orientation independent peripheral image enhancement;

DETAILED DESCRIPTION

Figure 1:
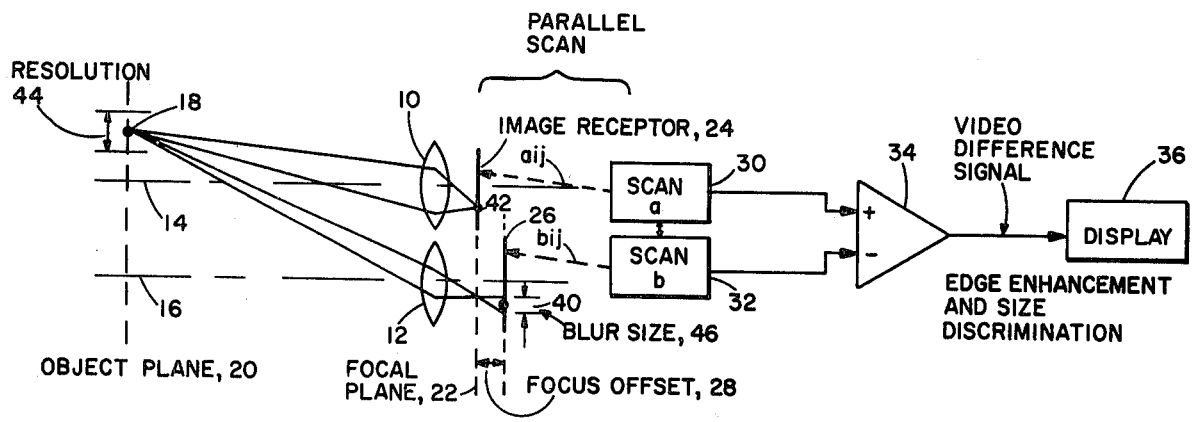
FIG. 1 is a diagramatic representation of one embodiment of the subject invention in which edge enhancement and size discrimination are accomplished by virtue of the generation of a video difference signal.

Referring now to FIG. 1 in one embodiment arranged for edge enhancement and size discrimination the subject invention includes a two barrel imaging system diagramatically illustrated by optical elements 10 and 12. These optical elements are focused at infinity and are arranged with parallel axes 14 and 16. An image 18, illustrated as a point on an object plane 20 is focused by optical elements 10 and 12 to a single focal plane 22. In this embodiment the optical systems represented by optical elements 10 and 12 are identical. For purposes of discussion the image produced by optical element 10 will be said to be formed in a first optical channel while the image formed by optical element 12 will be said to be formed in a second optical channel.

With respect to the first optical channel, an image receptor 24, which may be of any of a wide variety of image receptors, is located in focal plane 22. Locations on the receptor are labelled $i$ and $j$ which designates a location in orthogonal coordinates with the origin of the coordinates being axis 14, the optical axis of the first channel. "$a_{ij}$" is the signal due to the image associated with this location or address.

The image receptor for the second channel is indicated by reference character 26 and is offset from the focal plane by a focus offset 28. Receptor 26 therefore lies in a plane parallel to the focal plane and is offset by a given distance. Images on receptor 26 are indicated by $b_{ij}$ where the $ij$ location is in orthogonal coordinates, with the origin of the orthogonal system being axis 16, the optical axis of the second channel. The locations are designated such that the distances measured from each of the origins are in the same units. Thus, an image $a_{ij}$ in the first channel corresponds to an image $b_{ij}$ in the second channel for objects sufficiently far away from the subject apparatus (e.g. parallax is minimal). The receptors for each channel are read out in one embodiment by conventional scanning devices 30 and 32 in a twin scan mode which refers to the simultaneous readout of the receptors in each channel at corresponding points or locations. Thus, in this embodiment, an image $a_{ij}$ is read out simultaneously with an image $b_{ij}$. This can also be accomplished by controlled read out of a matrix type receptor such as a charge coupled matrix with individual matrix elements.

Figure 8A:
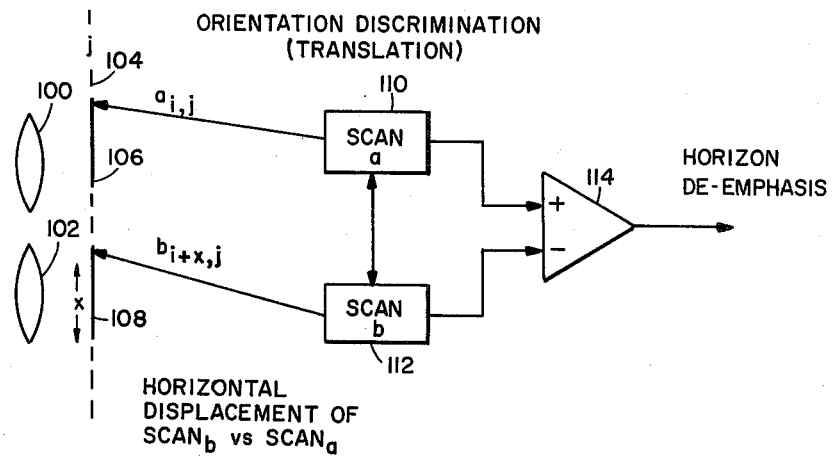
FIGS. 8A and 8B are diagramatic illustration of orientation discrimination by virtue of translation or offset in a twin scan process in which one of the scanning beams is offset in a predetermined direction to deemphasize elements of an image in this direction, while emphasizing elements perpendicular to the offset.

Thus it will be appreciated that the readout and scanning system may include conventional image orthocons wherein the intensity of the image at the receptor is read out as a signal having an amplitude proportional to the intensity of the image. Alternatively, the image receptor may be a charge coupled device (CCD) which is read out by XY addressable drive units which may be made to scan the respective CCD device. It will be further appreciated that when corresponding locations on the receptors are read out this corresponds to a parallel twin scan as distinguished from twin scan in which corresponding pairs or points are read out where the points are not at the same location relative to the origin. In this latter embodiment certain translational abberations can be introduced to emphasize various planes by simultaneously scanning adjacent points as will be described in connection with FIGS. 8A and 8B.

In all the systems to be described, the outputs of the scanning units are differentially added by differential amplifier 34 such that the output of the differential amplifier is a video difference signal which is coupled to a suitable video display 36 which is scanned in a manner commensurate with the scanning of the image receptors. This display can be a conventional CRT display or an XY addressable matrix in which a raster scan type drive system is utilized. In general, receptor and display may also be scanned in non-raster forms, as long as both are synchronized.

Because image receptor 26 is offset from the focal plane, the image at the receptor, herein referred to by reference character 40, is blurred. That is to say the image blur size with respect to an image at 42 at the focal plane on image receptor 24 is larger than for image 42 by a predetermined amount. When the scanning apparatus scans the image receptors and the result is displayed, the image displayed emphasizes the sharp edges of the image while washing out dull edges and gradual shading. It is assumed that video gains are adjusted to take maximum advantage of the enhanced image, whose contrast is generally reduced by the subtraction process unless the gain is suitably increased. Moreover, all objects on the object plane will appear to be washed out if their size exceeds the size of the blur 40 projected back to the object plane. Thus the resolution of the system as indicated by arrow 44 relates to the blur size as indicated by arrows 46 which is in turn determined by the focus offset 28.

This is useful in resolving small objects with respect to backgrounds which are large in extent. This situation can be better understood with reference to FIG. 2.

Figure 2:
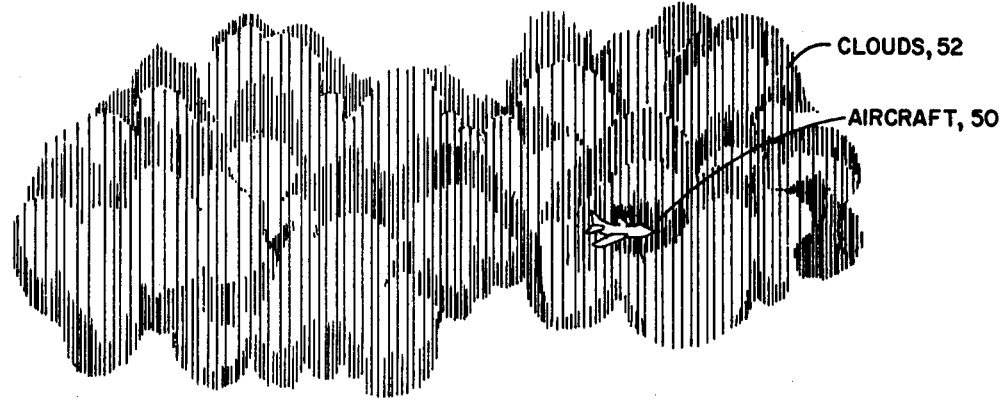
FIG. 2 is an illustration of a typical scene for which image enhancement is desired.
Figure 3A:
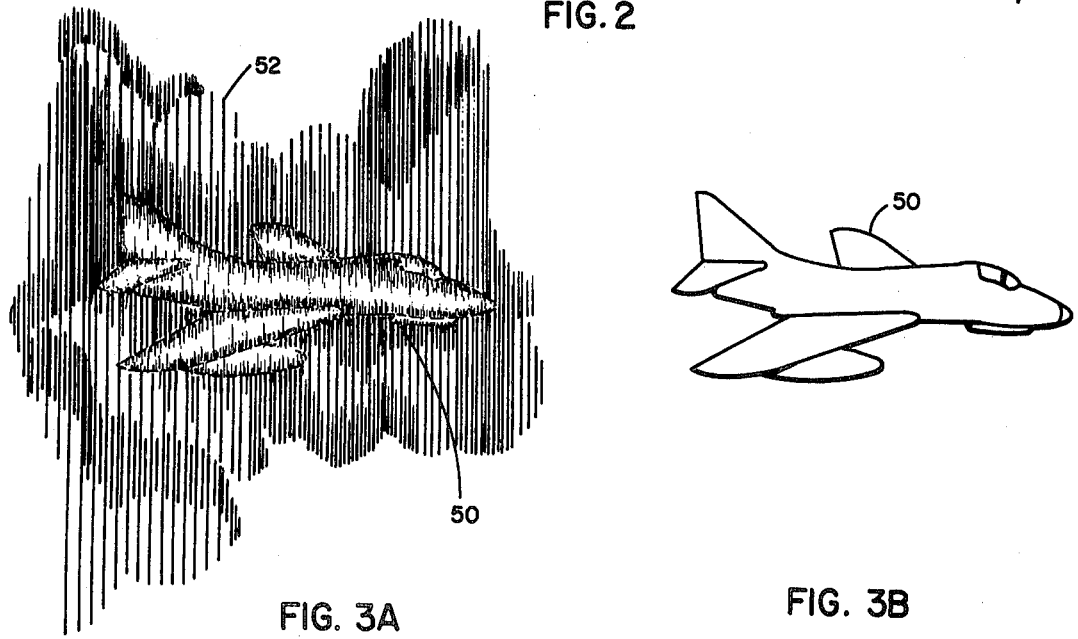
FIGS. 3A and 3B illustrate diagramatically the display of the scene of FIG. 2 prior to and after edge enhancement and size discrimination afforded by the apparatus of FIG. 1.
Figure 3B:
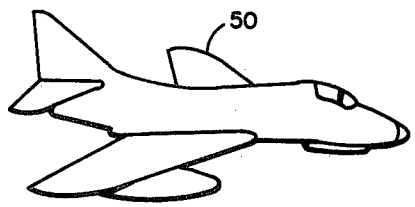

Referring now to FIG. 2 is a scene suitable for enhancement may include an aircraft 50 which is in front of cloud cover generally indicated at 52. The aircraft is located above a horizon 54, the importance of which will become apparent hereinafter. As illustrated in FIG. 3A an unenhanced portion of the scene in FIG. 2 may include the aircraft 50 in front of background clutter comprising clouds 52. However, by virtue of the system described in connection with FIG. 1, that which will be displayed on the display 36 of FIG. 1 is the outline of aircraft 50 in which the edges of the aircraft are that which are visible. The system of FIG. 1 has therefore not only discriminated against gradually changing portions of the scene such as the clouds which in general do not have sharp defined edges, but also has washed out objects larger than the aircraft with the appropriate setting of the blur size and focus offset to resolve objects having a length equivalent to aircraft and to discriminate against all other objects which are larger. In systems to be described in connection with FIGS. 8A and 8B and FIG. 9 it is possible to wash out the horizon line such that when aircraft 50 is near the horizon it can be emphasized with deemphasis of the horizon. In the FIG. 1 embodiment it will be appreciated that nothing here is absolutely washed out, but edges of aircraft are least affected, while clouds and other low spatial frequency objects are most affected. The horizon comes out inbetween.

The theoretical underpinings of the operation of the system of FIG. 1 are now described in connection with FIGS. 4 and 5. This explanation will also aid in the understanding of the different types of image enhancement and deemphasis described in connection with other embodiments of the subject invention.

Figure 4:
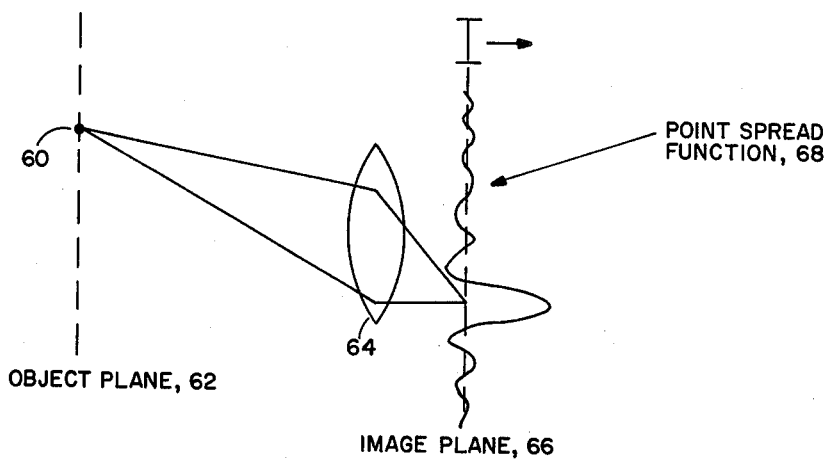
FIG. 4 is a diagramatic representation of the point spread function of an object projected onto an image plane.

Referring now to FIG. 4 the concept of a point spread function for an optical system will be developed. In this diagram an object 60 in an object plane 62 is focused by a lens system 64 onto an image plane 66. The intensity is a function of position and is given by the point spread function 68 which is the intensity of light along the image plane. As can be seen a point source of light at 60 produces not only light at the image point but also, depending on the quality of the optics, more or less light at points removed from the image point. By theorems well known in optics, any image is a convolution of the idealized image with the point spread function which would be a unit impulse (or a Dirac delta function) if the lens were "mathematically ideal." In actual physical systems there is always a blur circle of finite size, resulting from a combination of diffraction effects and geometric aberrations. The worst of these generally dominates any specific case, and the other may be ignored in practice.

Figure 5:
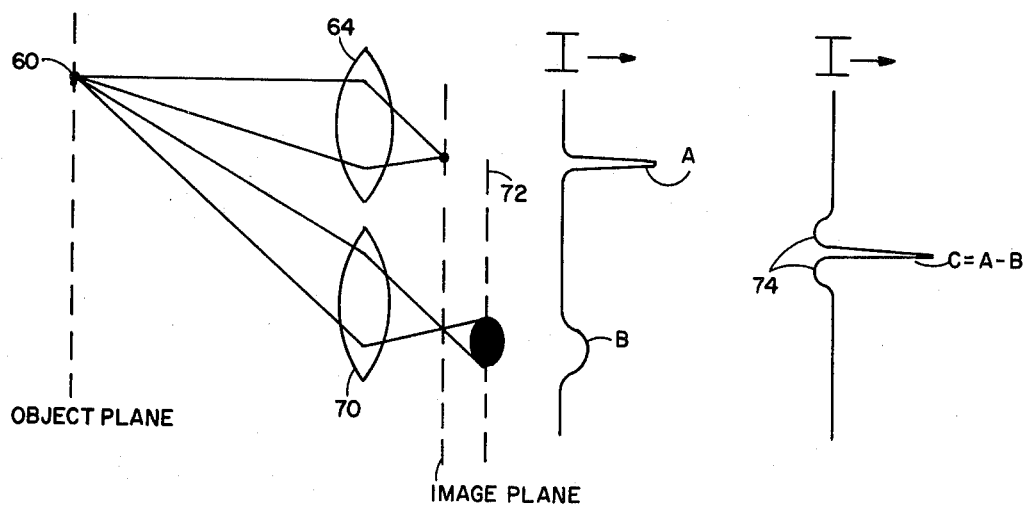
FIG. 5 is a diagramatic representation of a two barrel system in which an object on an object plane is focused by the two barrel system to a single image plane, also indicating the point spread functions of the focused image of one barrel and a defocused image of the other barrel with the difference function illustrating negative as well as positive going components of the point spread function of the difference.

Referring to FIG. 5, to the system of FIG. 4 is added a second identical optical system with a lens 70 arranged so that its focal plane is coincident with the focal plane of lens 64. In this system a blurred out image is formed at another plane 72 removed from the image plane of lens 70, and a first order approximation of the point spread function is illustrated to the right of this blurred out image. The offsetting of the receptor in the second channel changes the point spread function in this channel. When the point spread function at A is subtracted from the point spread function at B as illustrated in FIG. 5 a composite point spread function is formed in which the point spread function may go negative as illustrated at points 74. Thus C represents a modified point spread function. The result is that for a given image, high spatial frequencies (edges) are emphasized and low spatial frequencies (no-edges, unbroken extent, gradual intensity graduations) are deemphasized. The reason for this is that an edge represents a step function yielding a spatial frequency spectrum, proportional to 1/F, where F is spatial frequency. The frequency spectrum in this case refers not to the wavelength of the light utilized but rather refers to the change in intensity of the light with respect to position in cycles/mm (for example). A high frequency represents a very rapid change with position and a low frequency a gradual change. By virtue of the subtraction of the blurred image from the focused image which yields a transfer function $F^2$ times that of the focused system alone, rapid variations tend to be emphasized and gradual ones suppressed. It will be appreciated that the smaller the blur spot or circle the less will be the emphasis of the edges and the larger the blur circle the more clutter rejection and the more edge and point or small object emphasis. The reason for this is that the blur size in part determines the frequency below which this $F^2$-proportional behavior is dominant. As mentioned before the system also results in washout of all objects on the object plane which are larger than the resolution size which is defined by the projection of the blur circle back to the object plane. Thus the subject system in addition to favoring high spatial frequencies also has a resolution characteristic commensurate with the blur circle size.

Figure 6:
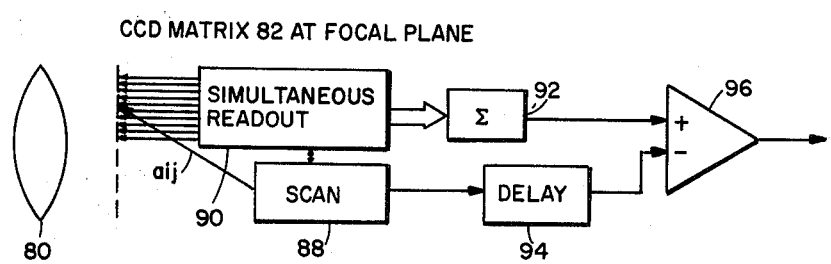
FIG. 6 is a diagramatic and schematic representation of a single barrel system for edge enhancement and size discrimination utilizing a single scan with simultaneous readout of elements adjacent the scanned element.
Figure 7:
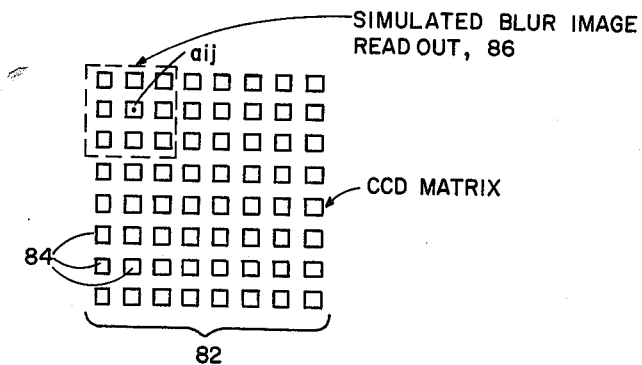
FIG. 7 is a diagramatic representation of the generation of the simulated blur image by virtue of reading out adjacent elements to a scanned element.

Referring now to FIG. 6, a single barrel system may be utilized to simulate the two channels of the aforementioned embodiment and to simulate the blur. In this case a single barrel system diagramatically illustrated at FIG. 7, shows the matrix to include a number of elements 84 each having a different orthogonal address, $ij$, from the center of the matrix. The blur is simulated in this embodiment by the simultaneous readout of all the elements within, for instance, a dotted box 86 which includes as a central element the $ij$ element which is at that moment of time being read out or scanned. Referring back to FIG. 6 this can be accomplished electronically as is conventional by a scanning device 88 which scans in sync with the simultaneous read out system 90. The simultaneous read out system and the scanning device are synchronized such that as the scanning device scans the matrix, the adjacent elements to the scanned element are simultaneously read out and summed as illustrated at 92. This may be a weighted sum in one embodiment. By weighted sum is meant that terms corresponding to different distances from the $ij$ coordinates are multiplied by different coefficients (+ or −) before the sum is taken. This in essence integrates the intensity of the image over a number of elements adjacent the element being scanned as is the case when a blur circle is utilized. The direct output from the scanning unit is delayed by a conventional delay unit 94 which compensates for the time required in the summing process. This may be either infinitesimally small or, if computers are utilized, the computation time must be taken into account. The outputs of the weighted summing device and the delay device are applied to a differential amplifier 96, the output of which is applied as mentioned before to a conventional raster scan type display such that edge enhancement and size discrimination are achieved in a single barrel system.

It will be appreciated that the blur size can be altered by the programming of the simultaneous read out unit so that any given number of elements surrounding the scanned element can be simultaneously read out with an increasing perimeter defining an increased blur size.

The previous discussion has centered around one type of enhancement, i.e. orientation independent edge enhancement. As the name would suggest, this enhancement is independent of the orientation of the image. It is sometimes useful to be able to either emphasize or deemphasize edges or structures which lie in a given set of directions or along a given set of lines. As mentioned hereinbefore, it is oftentimes desireable to deemphasize a horizon while emphasizing shapes above the horizon which are not parallel to it. This is accomplished in a "double barrel" system illustrated in FIG. 8A in which receptors for the two barrels lie in a common image plane.

In this embodiment the two barrels are represented by lens systems 100 and 102 which are identical and are axially offset such that the central axis or optical axes of the systems are parallel. Thus the systems share an image plane 104 at which receptors 106 and 108 are respectively located. This system also utilizes a twin scan system, with scanning units 110 and 112 scanning respective receptors and with their outputs differentially summed at a differential amplifier 114.

Figure 8B:
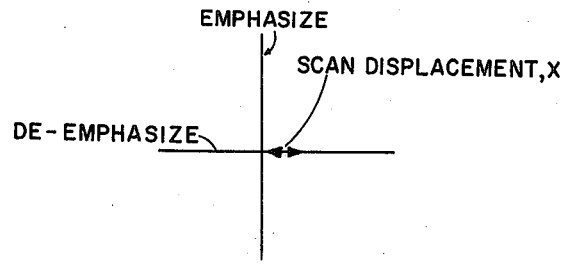

This system is not however a parallel scan system but rather the scanning location at receptor 108, herein labelled $i+x, j$, is offset or translated by a predetermined amount from the co-scanned location $ij$ at receptor 106 at any given instant of time. The $x$ direction of scanning beam offset, if in the horizontal direction results in a video difference signal at the output of a differential amplifier 114 which deemphasizes horizontal lines while emphasizing vertical lines when displayed. It will be apparent that either by virtue of rotation of the complete apparatus or by appropriate control of the scanning beams any particular line orientation can be chosen as a deemphasized line with a line orthogonal thereto being emphasized. The first situation is illustrated in FIG. 8B.

Referring to FIG. 9 the same result is achieved by skewing the axis of lens system 102 such that a focused spot is displaced in the x direction. As illustrated in this case, parallel twin scan apparatus may be utilized such that scanning unit 120 and scanning unit 122 parallel scan receptors 106 and 108. Thus corresponding locations on each receptor are simultaneously scanned as illustrated by the $a_{ij}/b_{ij}$ notation. The outputs when differentially added by differential amplifier 114 result in the same type of plane emphasis/deemphasis as described in connection with FIGS. 8A and 8B. It will be appreciated that the line orientations deemphasized will be parallel to the direction of axis skew.

Another type of image enhancement is illustrated in FIGS. 10A and 10B and FIGS. 11A – 11C. In these embodiments objects at the periphery of the image are emphasized while the central image is relatively washed out. This type of imaging system is important in the detection of objects just entering the field of view. The system illustrated in FIG. 10A is a two-barrel parallel twin scan system in which an object 130 on an object plane 132 is focused by two different lens systems 134 and 136. The characteristic of this system is the difference in magnification of the lens systems. The difference in magnification causes emphasis of circumferential lines at the periphery of the image. In this embodiment there are two different image planes and corresponding receptors located at these image planes. These receptors are indicated respectively at 138 and 140. The parallel twin scan is, as mentioned hereinbefore, accomplished by synchronized scanning units, herein referred to as scanning unit 142 and scanning unit 144, the outputs of which are coupled to a differential amplifier 146 to provide the required difference signal.

The parallel scan is illustrated by the corresponding scan locations $a_{ij}$ and $b_{ij}$. The resulting circumferential peripheral image enhancement is illustrated in FIG. 10B and occurs when the output of differential amplifier 146 is applied to a conventional raster scan display. In this figure the heavier density of circles indicates enhanced intensity.

Figure 11B:
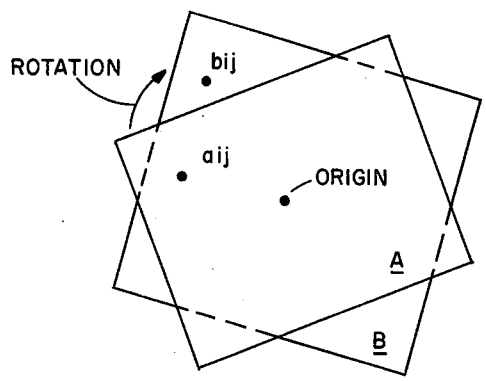
Figure 11C:
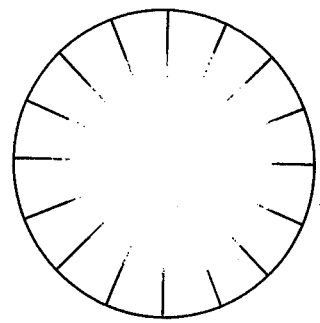

For radially lying images, peripheral enhancement may be achieved by rotationally displaced image planes and such a system is illustrated in FIGS. 11A through 11C. Referring to FIG. 11A an object 141 is focused via identical lensing systems 143 onto rotationally displaced image receptors A and B both located in focal plane 145 which is the same for both lensing systems. The rotation of the receptors is illustrated in FIG. 11B. In this embodiment, one receptor is rotated with respect to the other about what is effectively the common origin of the receptors, such that corresponding points on the receptors are in effect locally translated one from the other by a magnitude proportional to distance from center, and in a circumferential direction. Referring back to FIG. 11A, a rotationally displaced twin scan system is diagramatically illustrated in which scanning units 145 and 147 are operated in synchronism.

The outputs from these units are differentially added at 149 to produce a video difference signal.

In this scanning arrangement each scanning unit scans a corresponding element or location on its respective receptor. Since the receptors are rotated with respect to each other, the scans correspondingly are rotated. Thus the A receptor intensity at $ij$ is read out simultaneously with the B receptor intensity at the corresponding $ij$ location. In this case locations on a receptor are measured relative to the coordinates of the receptor and any scanning system which reads out corresponding locations simultaneously on each receptor is within the scope of this invention.

Since the receptors are rotated it will be apparent that at their peripheries the local image translation will be maximized, whereas at the center very little if any translation will occur. When the images at these receptors are electronically subtracted, radial elements or lines will be emphasized at the periphery of the reconstructed image as illustrated in FIG. 11C, with the centrally located radially aligned images being more and more washed out towards the center of the image.

Figure 12A:
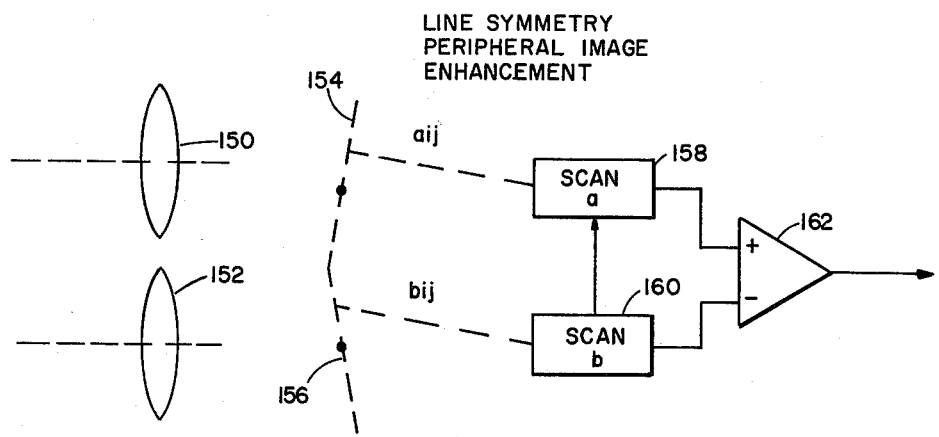
FIGS. 12A and 12B illustrate a system for line symmetry peripheral image enhancement in a parallel twin scan system in which identical optical systems are utilized with skewed receptor planes to produce line symmetry peripheral image enhancement.
Figure 12B:
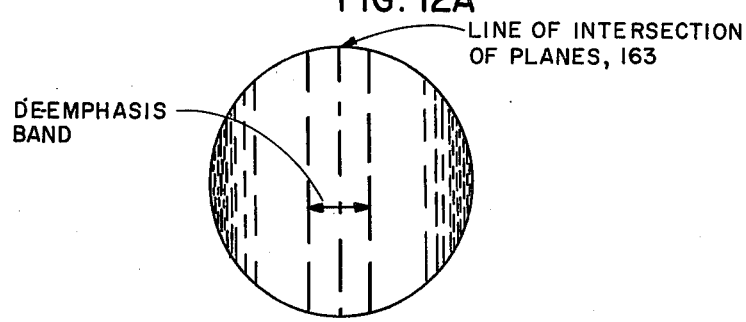

Referring to FIGS. 12A and 12B, a system which enhances elements towards that portion of the periphery of the image which is furthest from an image intersection line can be achieved in a two barrel system with identical lensing systems 150 and 152 with parallel axes and receptors in skewed projection planes 154 and 156. Parallel twin scan is utilized with scanning units 158 and 160 having outputs differentially summed at 162. The result of the parallel twin scan is illustrated in FIG. 12B with peripheral image enhancement illustrated as the denser shading, indicating enhanced elements at that portion of the periphery of the image removed from line 163. Line 163 represents the intersection of projection planes 154 and 156 when one is superimposed on the other. Obviously this line can be given any desired direction and position so as to deemphasize objects in a given band as illustrated by arrows 164. This is referred to as line symmetry peripheral enhancement.

Referring now to FIGS. 13A and B and 16A, B and C, if it is desireable to enhance the center portion of the image, the subject system may be utilized in a double barrel approach as illustrated in FIG. 13A with lensing systems 170 and 172 being of identical nature with parallel optical axes. In this embodiment receptors 174 and 176 are located along the image planes of these respective optical elements and a parallel twin scan system is again used, with scanning units 178 and 180 having outputs coupled to a differential amplifier 182. In this embodiment a conventional field flattening element 184 is located at the receptor for one of the barrels such that the displayed output from the differential amplifier appears as illustrated in FIG. 13B with central enhancement and peripheral washout, for boresite or central image enhancement.

Referring now to FIG. 14A, the field flattening element is positioned such that the image surface for the first barrel is coincident with the curved image surface produced by the field flattening element of the second barrel at the periphery of the overlapped image. The image surfaces illustrated result from a composite image in which the image from one barrel is superimposed on the image of the other barrel. Since the double barrel optical approach in essence simulates this overlapping by virtue of the close spacing and the axial alignment of the barrels, it will be appreciated that a field flattening element may be appropriately configured and positioned such that the image surfaces produced are coindicent at the periphery of the combined image planes. This produces a centrally enhanced image as illustrated in FIG. 14B. Another property of this configuration is that images at the center accept larger sized objects, while large size objects on the periphery are washed out. It should be noted, as illustrated in FIG. 15A that if image surface coincidence for these two images, rather than being at the periphery of the combined image, is at the center of the combined image, then rather than boresite or central image enhancement a peripheral image enhancement, as illustrated in connection in FIG. 15B, will be the result. Note in this case the system is independent of image orientation. Moreover the periphery accepts large size objects while large size objects at the center are washed out.

Figure 16A:
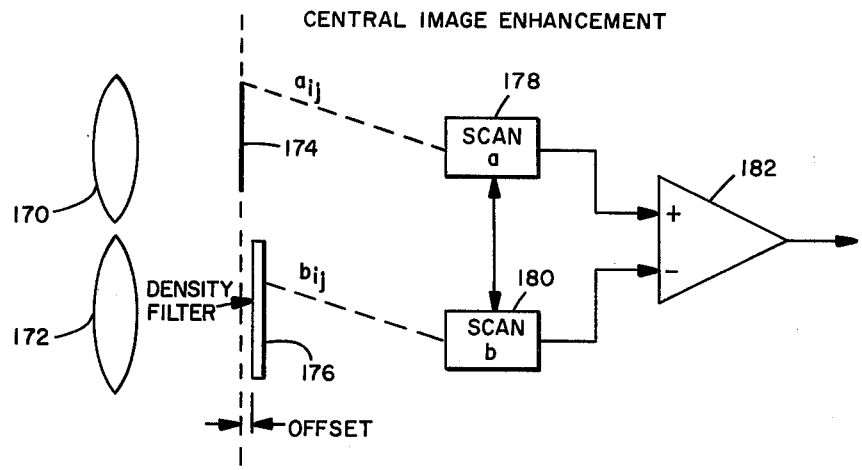
FIGS. 16A through 16E illustrate a central/peripheral image enhancement system with focus-defocus enhancement and size discrimination utilizing parallel twin scan with alternatively a centrally weighted, radially weakening density filter or a peripherally weighted radially weakening density filter offset from the image plane of one of the optical sytems for opposite type enhancements.
Figure 16B:
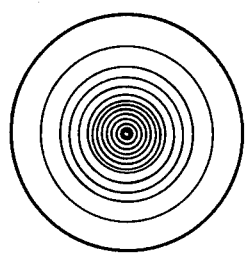
Figure 16C:
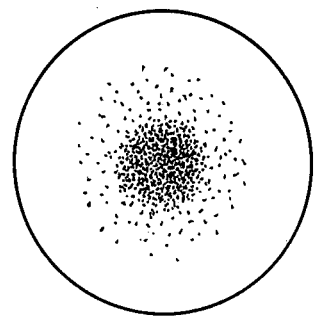
Figure 16D:
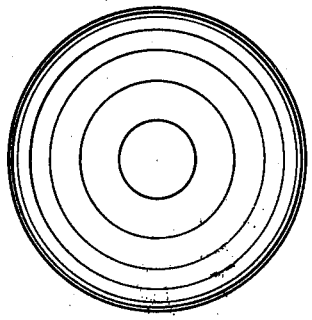
Figure 16E:
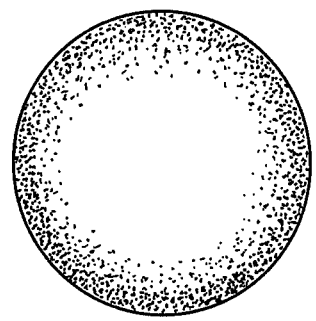

Referring now to FIGS. 16A–C, central image enhancement with edge enhancement and size discrimination can also be accomplished in a focus-defocus parallel twin scan system. In this embodiment, however, the field flattening element is replaced with a centrally weighted radially weakening density filter 177 such as that illustrated in 16B. This filter is positioned at receptor 176 which in this embodiment is offset as illustrated to give the same type of enhancement as the apparatus of FIG. 1. As can be seen this filter is more dense centrally and its transmisivity decreases outwardly. This results in an additional enhancement, e.g. a central image enhancement, as illustrated in FIG. 16C. In this figure the denser dot concentrations indicate increased enhancement at the center of the image with decreasing enhancement towards the periphery of the image. This method is also independent of orientation. As expected, size discrimination is for the same size objects at all positions in image plane. A reverse effect can be achieved by a peripherally weighted filter, as illustrated in FIGS. 16D and E. Thus two different enhancement techniques may be combined.

What has been described thus far relates to changes in the point spread function by manipulations of the lens characteristics and by manipulations in the image-receptor plane.

Different types of enhancement can however be achieved by the use of inhomogenous filters in the vicinity of the aperture plane of an optical system or as a special case by the use of different shapes or sizes or apertures. This is called "apodization". The aperture plane is that plane at which a conventional shutter would uniformly darken all parts of an image simultaneously. While there are numerous types of emphasis that can be achieved by apodization, in one example emphasis of right angled shapes can be accomplished as illustrated in FIGS. 17A–17D by provision of a circular and a square aperture, respectively 190 and 191 at the aperture planes of lens systems 192 and 193, respectively forming two optical channels. These lens systems are identical and have a common focal plane at which receptors 194 and 195 are placed. These receptors are scanned in a parallel twin scan fashion by scanning units 196 and 197 respectively. The outputs of these units are added differentially by a differential amplifier 198 to obtain a video difference signal.

Figure 17A:
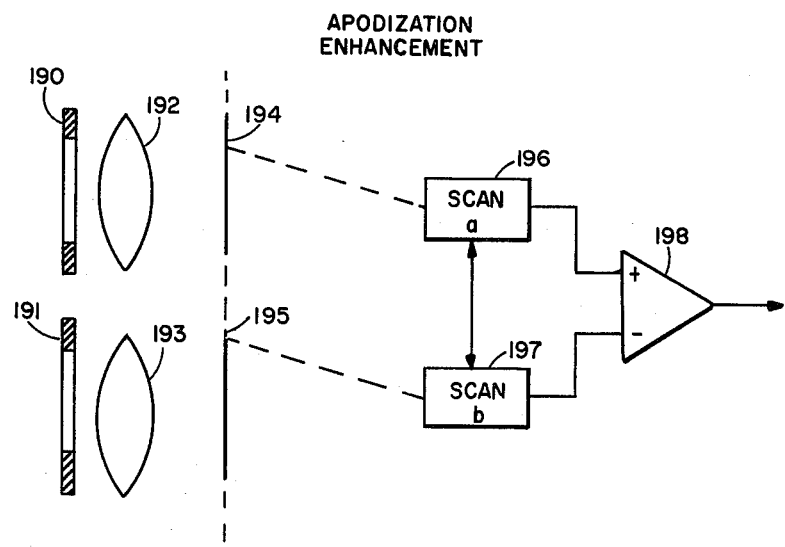
FIGS. 17A–D illustrate one form of apodization as a method for introducing selected image enhancements.
Figure 17B:
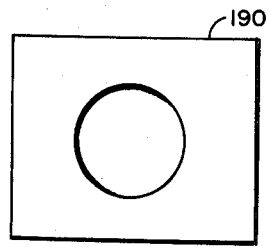
Figure 17C:
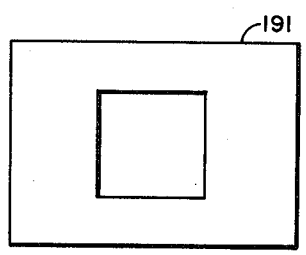
Figure 17D:
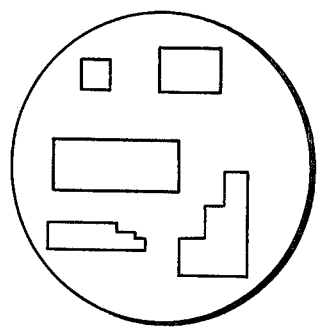

By virtue of the differing aperture configurations (FIGS. 17B and 17C) objects at right angles as illustrated in FIG. 17D are emphasized. This is important in distinguishing man made objects from natural surroundings.

A less complex apodization system (not illustrated) similar to that illustrated in FIG. 17A involves a parallel twin scan of receptors in a common focal plane in which aperture configurations are similar, but different $f$ stops are used. This is equivalent to the focus-defocus case of FIG. 1 in which edge enhancement is achieved.

Figure 18:
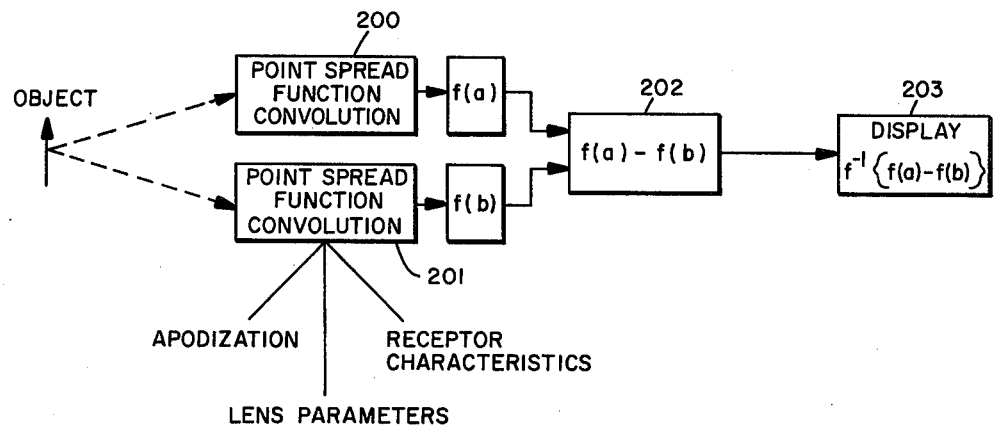
FIG. 18 is a generalized diagram enumerating the types of enhancement available with the subject invention.

Referring now to FIG. 18, the general case is illustrated in which an object having a particular point spread function has its point spread function convoluted differently in two optical channels here illustrated by boxes 200 and 201. As discussed, the point spread function convolution can be altered in one optical channel by, apodization, differences in lens parameters and by receptor orientation or placement.

The signals in these two channels are in general operated on by function $f(a)$ and $f(b)$ and the result combined as illustrated at 202 in a function $\{f(a) - f(b)\}$ where $f$ is any monotonic function. What is displayed is the inverse function, $f^{-1}\{f(a) - f(b)\}$, as illustrated at 203.

What has been described thus far are real time systems for corresponding point pair readout and subsequent subtraction to produce a video difference signal. In essence the subject approach as described so far is an analog approach. However, it will be appreciated that each of the simultaneously scanned pairs of locations may be described by an appropriate address with the image readout value for each location assigned a unique address for further digital processing. One such digital processing system which involves a single barrel approach is illustrated in FIG. 19.

Figure 19:
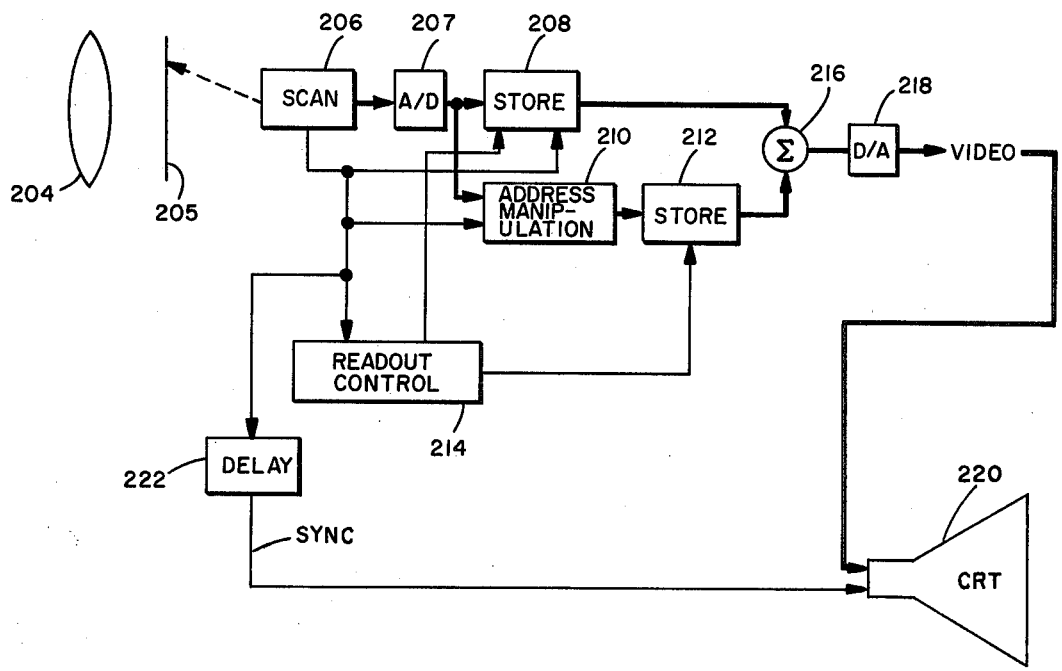
FIG. 19 illustrates a digital approach and a single barrel system for producing a variety of different image enhancements.

Referring to FIG. 19 the single barrel system is illustrated by optical element 204 which forms an image on a receptor 205. This receptor is scanned by a scanning device 206, the output of which is converted from analog form to digital form by an analog to digital converter 207. The output of the A/D converter is stored at 208 along with the appropriate address of the scanned element. The output from the analog to digital converters is also applied to a device 210 which forms the negative of the digital value and gives this value an appropriate address. This unit also manipulates the addresses of these values in order, for instance, to specify adjacent element for enhancement of a particular plane. The output of unit 210 is applied to a storage unit 212. Storage units 208 and 212 are read out in accordance with a read out control circuit 214 through a summation device 216 and the output of the summation device is converted from a digital signal to an analog signal by a digital to analog converter 218. The read out is controlled in part by the scanning device 204 such that (+—) pairs of numbers are added at 216. The readout control runs at the same speed as the scanning unit on a point by point basis such that the output from the digital-to-analog converter 218 is equivalent of the differential video signal mentioned hereinbefore. This signal may be applied to a conventional display device such as a CRT 220 which is strobed with a predetermined delay equal to the processing time via delay unit 222. In this manner any number of functions may be applied to the signal tapped from the analog to digital converter, either in terms of address manipulation or amplitude weighting, tec.

What has therefore been provided is a very versatile apparatus and method for the emphasis or deemphasis of various charactristics of an image utilizing either a one barrel or two barrel approach and a differential addition process. It will be appreciated however that instead of a video difference signal being generated, ratios can be taken of the two signals in the two simulated channels so as to produce various different kinds of enhancement available from a multiplicative process. Note also, as elaborated before, any functional difference $f^{-1}\{f(a_{ij})-f(b_{ij})\}$ or $f^{-1}\{f(a_{ij})-f(b_{ks})\}$ may be utilized, where $f(x)$ is a monotonic function and $(i\text{-}k)$ and $(j\text{-}s)$ are kept within suitable limits (for instance, substantially less than the number of TV lines). Thus, a wide variety of nonlinear enhancements, and of enhancements dependent on position in the image plane are included which goes beyond spatial filtering.

Additionally, one of the things that will be appreciated is that the subject system can be used to check differences between lens systems. Thus lens systems can be checked against a standard and the differences displayed. By analysis of the difference pattern, the differences in the lens systems can be ascertained and recorded. Thus the subject apparatus may be utilized as a test instrument.

Although a specific embodiment to the invention has been described in considerable detail for illustrative purposes, many modifications will occur to those skilled in the art. It is therefore desired that the protection afforded by Letters Patent be limited only by the true scope of the appended claims.

What is claimed is:

1. A method of enhancing predetermined characteristics of an image of an object comprising the steps of:
   forming two representations of the object, with one of said representations having a point spread function different from the other of said representations;
   reading out the intensity of the representations at corresponding points so as to form two electrical signals, having values $a$ and $b$ respectively;
   combining said signals in accordance with $f^{-1}\{f(a)-f(b)\}$ where $f$ is a monotonic function to produce a composite signal; and
   displaying said composite signal in a manner corresponding to the readout.

2. The method of claim 1 wherein said forming step includes an optical system having a predetermined aperture, a lens system and receptors for detecting respectively said representations.

3. The method of claim 2 wherein said point spread function difference is a function of apodization.

4. The method of claim 2 wherein said point spread function difference is a function of lens system parameters.

5. The method of claim 2 wherein said point spread function difference is a function of receptor positioning with respect to said lens system.

6. The method of claim 2 wherein said readout step includes a synchronized twin scan of the receptors at corresponding points.

7. The method of claim 6 wherein said twin scan is parallel in which points at the same locations on the receptors are simultaneously read out.

8. The method of claim 6 wherein a point at a first location on one receptor is simultaneously read out with a location adjacent to this first location on the other receptor, whereby enhancement of lines parallel to the direction of the adjacency are deemphasized.

9. The method of claim 7 wherein one of said receptors is at the focal plane of said lens system and wherein the other of said receptors is removed from said focal plane, whereby edge enhancement is achieved.

10. The method of claim 7 wherein said lens system includes two optical lens subsystems having skewed optical axis, and wherein each receptor lies in the focal plane of one of said two optical lens subsystems, whereby lines parallel to the direction of axis skew are deemphasized.

11. The method of claim 7 wherein said lens system includes two optical subsystems having different magnifications and wherein said receptors are located respectively at the focal planes of said lens subsystems whereby circumferential line peripheral image enhancement is achieved.

12. The method of claim 6 wherein said receptors are rotated and wherein said twin scan is likewise rotated so that corresponding locations on the receptors are simultaneously scanned, whereby radial line peripheral image enhancement is achieved.

13. The method of claim 7 wherein said lens system includes lens subsystems with parallel optical axes and rotationally offset receptors, whereby radial and circumferential line peripheral enhancement is achieved.

14. The method of claim 7 wherein said lens system includes two lens subsystems and wherein an element that modifies field curvature is located at the focal plane of one of the lens subsystems.

15. The method of claim 14 wherein image surface coincidence for the two lens subsystems is at the periphery of the image surfaces when superimposed whereby orientation independent boresite enhancement is achieved.

16. The method of claim 14 wherein image surface coincidence for the two lens subsystems is at the center of the image surfaces when superimposed whereby orientation independent peripheral image enhancement is achieved.

17. The method of claim 7 wherein said lens system includes two lens subsystems and wherein an inhomogenous filter is located near the aperture plane of one of the lens subsystems.

18. The method of claim 7 wherein said lens system includes two lens subsystems having differing aperture parameters.

19. The method of claim 18 wherein said aperture parameters includes the shape of the apertures.

20. The method of claim 18 wherein said aperture parameters includes the size of the apertures.

* * * * *

UNITED STATES PATENT OFFICE
CERTIFICATE OF CORRECTION

PATENT NO. : 3,987,243
DATED : October 19, 1976
INVENTOR(S) : Jacob Schwartz

It is certified that error appears in the above-identified patent and that said Letters Patent are hereby corrected as shown below:

Column 3, line 11, line 21-22, line 32, "parallel twin scan", each occurrence, should read -- "parallel twin scan" --.

Column 3, line 55, cancel " $= ^{-1}\{f(a_{x,y}) - f(b_{x,y})\}$ " and substitute therefore -- $= f^{-1}\{f(a_{x,y}) - f(b_{x,y})\}$ --.

Column 4, line 1, cancel "(x, y) — M ξ " and substitute therefore --(x, y) = M ξ --.

Column 4, line 4, cancel "idealized image" and substitute therefore --"idealized" image--.

Column 4, line 6, delete "M $\eta'$ ),"

Column 7, line 13, cancel "two barrel" and substitute therefore --"two barrel"--.

Column 7, line 65, cancel "parallel twin scan" and substitute therefore --"parallel twin scan"--.

Column 14, line 54, cancel "(+—)" and substitute therefore --(+ -)--.

Signed and Sealed this

Fifth Day of April 1977

[SEAL]

Attest:

RUTH C. MASON
*Attesting Officer*

C. MARSHALL DANN
*Commissioner of Patents and Trademarks*